(12) United States Patent
Battaglia

(10) Patent No.: US 10,231,307 B2
(45) Date of Patent: *Mar. 12, 2019

(54) LOAD CURRENT CONTROL CIRCUIT

(71) Applicant: Phoseon Technology, Inc., Hillsboro, OR (US)

(72) Inventor: Salvatore Battaglia, Vancouver, WA (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,357

(22) Filed: Jan. 9, 2018

(65) Prior Publication Data

US 2018/0132324 A1 May 10, 2018

Related U.S. Application Data

(63) Continuation of application No. 14/965,771, filed on Dec. 10, 2015, now Pat. No. 9,867,252, which is a continuation of application No. 13/830,887, filed on Mar. 14, 2013, now Pat. No. 9,277,623.

(60) Provisional application No. 61/617,496, filed on Mar. 29, 2012.

(51) Int. Cl.
*H05B 37/02* (2006.01)
*H05B 33/08* (2006.01)

(52) U.S. Cl.
CPC ..... *H05B 33/0851* (2013.01); *H05B 33/0815* (2013.01); *H05B 33/0827* (2013.01); *H05B 37/02* (2013.01); *H05B 37/0227* (2013.01); *Y02B 20/347* (2013.01)

(58) Field of Classification Search
CPC  H05B 37/02; H05B 33/0815; H05B 33/0851; H05B 33/0827; H05B 37/0227; Y02B 20/347
USPC .................................................. 315/297
See application file for complete search history.

(56) References Cited

U.S. PATENT DOCUMENTS

| 9,866,117 | B2* | 1/2018 | Hu | H02M 3/158 |
| 2010/0079127 | A1* | 4/2010 | Grant | H02M 3/156 323/285 |
| 2012/0119677 | A1* | 5/2012 | Serdarevic | H05B 33/0812 315/307 |
| 2014/0232271 | A1* | 8/2014 | Wiegele | H05B 33/0815 315/127 |
| 2014/0253056 | A1* | 9/2014 | Hu | H02M 3/158 323/205 |

* cited by examiner

*Primary Examiner* — Don Le
(74) *Attorney, Agent, or Firm* — McCoy Russell LLP

(57) ABSTRACT

A system and method for operating one or more light emitting devices is disclosed. In one example, the intensity of light provided by the one or more light emitting devices is adjusted responsive to current feedback from the one or more light emitting devices.

18 Claims, 5 Drawing Sheets

LOAD CURRENT CONTROL CIRCUIT

CROSS REFERENCE TO RELATED APPLICATIONS

The present application is a continuation of U.S. Non-Provisional application Ser. No. 14/965,771, entitled "LOAD CURRENT CONTROL CIRCUIT", and filed on Dec. 10, 2015, now U.S. Pat. No. 9,867,252. U.S. Non-Provisional application Ser. No. 14/965,771 is a continuation of U.S. Non-Provisional application Ser. No. 13/830,887, entitled "LOAD CURRENT CONTROL CIRCUIT," and filed on Mar. 14, 2013, now U.S. Pat. No. 9,277,623. U.S. Non-Provisional patent application Ser. No. 13/830,887 claims priority to U.S. Provisional Patent Application No. 61/617,496, entitled "LOAD CURRENT CONTROL CIRCUIT," and filed on Mar. 29, 2012. The entire contents of each of the above-identified applications are incorporated herein by reference for all purposes.

BACKGROUND/SUMMARY

Solid-state lighting devices have many uses in industrial applications. Ultraviolet (UV) lighting devices have become fairly common for curing photo sensitive media such as coatings, including inks, adhesives, preservatives, etc. Curing time of these photo sensitive media may be controlled via adjusting intensity of light directed at the photo sensitive media or the amount of time that the photo sensitive media is exposed to light from the solid-state lighting device. Solid-state lighting devices typically use less power, cost less and may have easier disposal than current mercury arc lamp devices.

Solid-state lighting devices may consist of laser diodes or light-emitting diodes (LEDs) as examples. The device typically has an array or several arrays arranged to provide light with a particular profile, such as a long, thin light region, or wider and deeper light regions. The individual elements reside in arrays, a lighting device may consist of several arrays, or several arrays arranged in modules, with the lighting device having several modules. If the solid state lighting devices are supplied with a varying amount of current, or if different groups of photo sensitive media are exposed to light for different durations, photo sensitive curing times may vary or may be insufficient to provide a desired level of curing.

The inventor herein has recognized the above-mentioned disadvantages and has developed a system for operating one or more light emitting devices, comprising: a voltage regulator including a feedback input, the voltage regulator in electrical communication with the one or more light emitting devices; and a current sensing device positioned in a current path through which a current passes through the one or more light emitting devices.

By controlling current flow through a lighting array based on current feedback, it may be possible to more precisely control light intensity of a lighting array. For example, current flowing through a variable resistance device may be controlled responsive to current flow that is measured flowing through a lighting array. As a result, current supplied to the lighting array and light intensity may converge to desired values. In other examples, a voltage output of a buck voltage regulator may be adjusted responsive to current flowing through a lighting array. Current flowing through the lighting array is adjusted via varying voltage applied to the lighting array. In this way, the buck voltage regulator is adjusted responsive to current flow through the lighting array so as to provide closed loop feedback control of current flowing through the lighting array.

The present description may provide several advantages. Specifically, the approach may improve lighting system light intensity control. Further, the approach may provide lower power consumption via providing efficient electrical current control. Further still, the approach may be provided via alternative devices so that the design remains flexible and cost effective.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
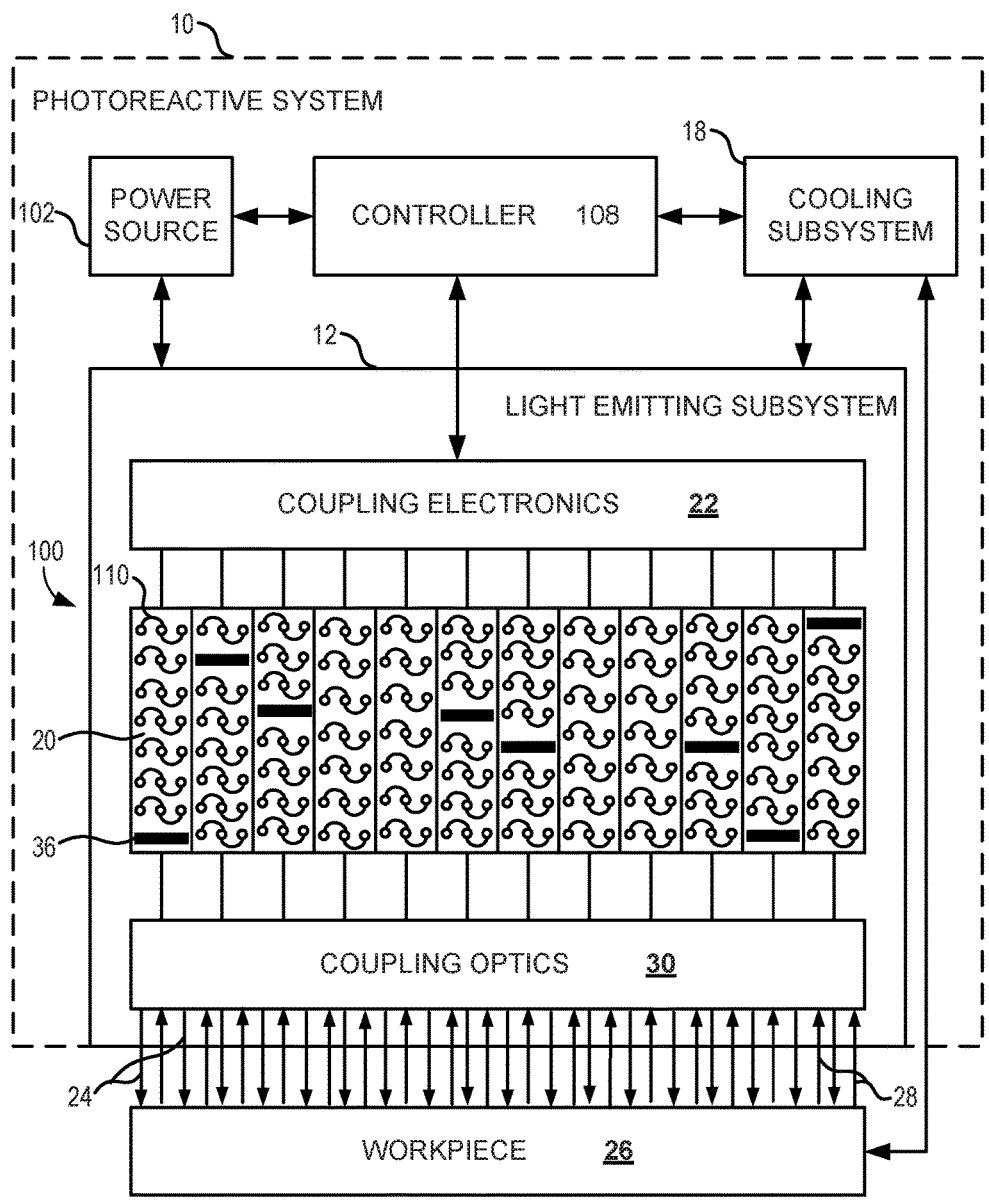
FIG. 1 shows a schematic depiction of a lighting system.
Figure 2:
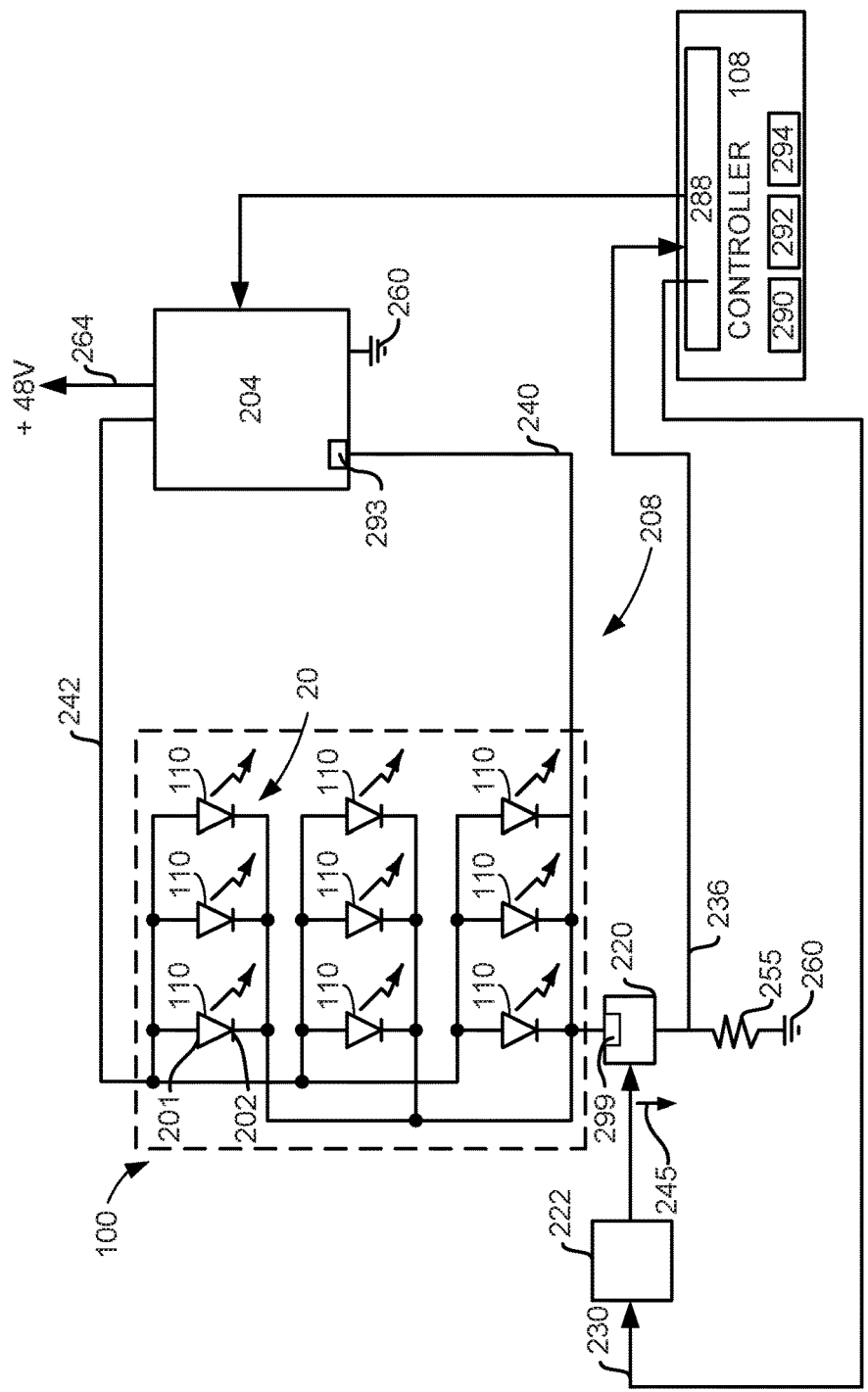
FIGS. 2-4 show schematics of example current regulating systems.
Figure 3:
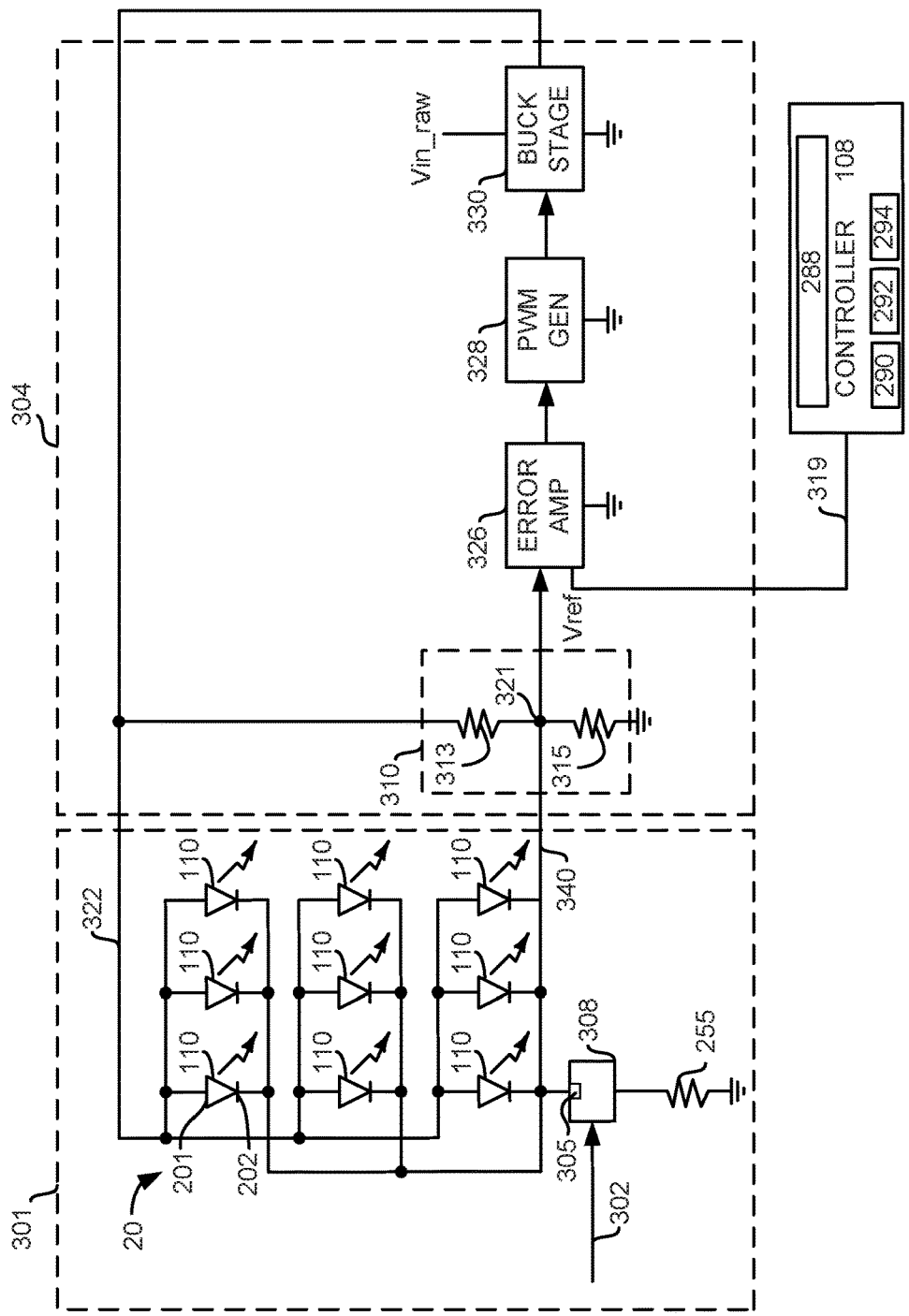
Figure 4:
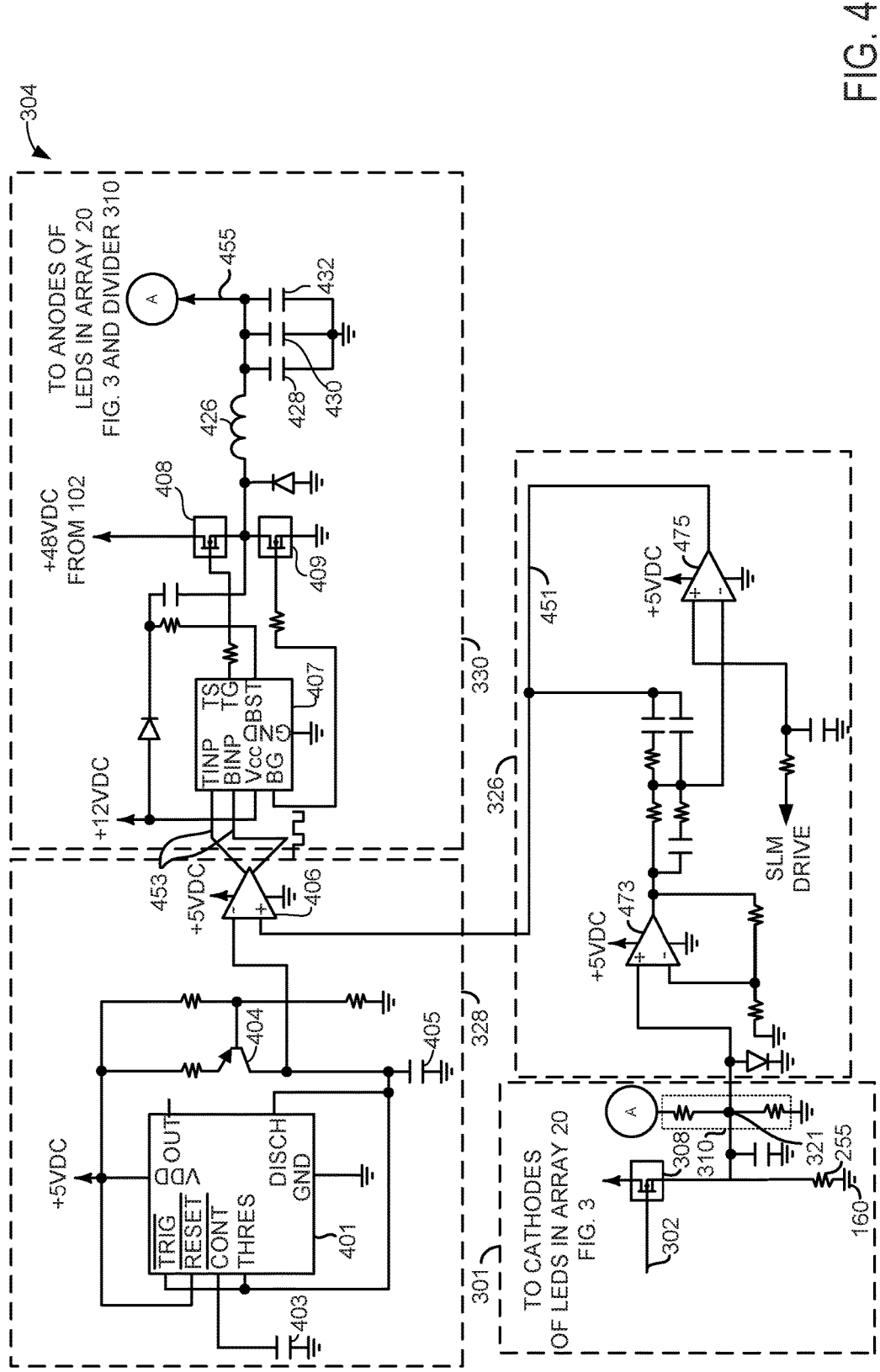

The present description is related to a lighting system with regulated current. FIG. 1 shows one example lighting system in which regulated current control is provided. The lighting current control may be provided according to example circuits as shown in FIGS. 2-4. However, alternative circuits that provide the described function or that operate similar to the circuits shown are also included within the scope of the description. The lighting system may be operated according to the method of FIG. 5. Electrical interconnections shown between components in the various electrical diagrams represent current paths between the illustrate devices.

Referring now to FIG. 1, a block diagram of a photoreactive system 10 in accordance with the system and method described herein is shown. In this example, the photoreactive system 10 comprises a lighting subsystem 100, a controller 108, a power source 102 and a cooling subsystem 18.

The lighting subsystem 100 may comprise a plurality of light emitting devices 110. Light emitting devices 110 may be LED devices, for example. Selected of the plurality of light emitting devices 110 are implemented to provide radiant output 24. The radiant output 24 is directed to a work piece 26. Returned radiation 28 may be directed back to the lighting subsystem 100 from the work piece 26 (e.g., via reflection of the radiant output 24).

The radiant output 24 may be directed to the work piece 26 via coupling optics 30. The coupling optics 30, if used, may be variously implemented. As an example, the coupling optics may include one or more layers, materials or other structure interposed between the light emitting devices 110 providing radiant output 24 and the work piece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such micro-reflector array, each semiconductor device providing radiant output 24 may be disposed in a respective micro-reflector, on a one-to-one basis.

Each of the layers, materials or other structure may have a selected index of refraction. By properly selecting each index of refraction, reflection at interfaces between layers, materials and other structure in the path of the radiant output 24 (and/or returned radiation 28) may be selectively controlled. As an example, by controlling differences in such indexes of refraction at a selected interface disposed between the semiconductor devices to the work piece 26, reflection at that interface may be reduced, eliminated, or minimized, so as to enhance the transmission of radiant output at that interface for ultimate delivery to the work piece 26.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned radiation 28, or for other purposes, alone or in combination. As a further example, the photoreactive system 10 may employ coupling optics 30 so as to enhance the effective quality or quantity of the radiant output 24, particularly as delivered to the work piece 26.

Selected of the plurality of light emitting devices 110 may be coupled to the controller 108 via coupling electronics 22, so as to provide data to the controller 108. As described further below, the controller 108 may also be implemented to control such data-providing semiconductor devices, e.g., via the coupling electronics 22.

The controller 108 preferably is also connected to, and is implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, the lighting subsystem 100 may be of various types. As an example, the data may be representative of one or more characteristics associated with coupled semiconductor devices 110, respectively. As another example, the data may be representative of one or more characteristics associated with the respective component 12, 102, 18 providing the data. As still another example, the data may be representative of one or more characteristics associated with the work piece 26 (e.g., representative of the radiant output energy or spectral component(s) directed to the work piece). Moreover, the data may be representative of some combination of these characteristics.

The controller 108, in receipt of any such data, may be implemented to respond to that data. For example, responsive to such data from any such component, the controller 108 may be implemented to control one or more of the power source 102, cooling subsystem 18, and lighting subsystem 100 (including one or more such coupled semiconductor devices). As an example, responsive to data from the lighting subsystem indicating that the light energy is insufficient at one or more points associated with the work piece, the controller 108 may be implemented to either (a) increase the power source's supply of current and/or voltage to one or more of the semiconductor devices 110, (b) increase cooling of the lighting subsystem via the cooling subsystem 18 (i.e., certain light emitting devices, if cooled, provide greater radiant output), (c) increase the time during which the power is supplied to such devices, or (d) a combination of the above.

Individual semiconductor devices 110 (e.g., LED devices) of the lighting subsystem 100 may be controlled independently by controller 108. For example, controller 108 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 110, or may be from more than one array of semiconductor devices 110. Arrays of semiconductor devices 110 may also be controlled independently by controller 108 from other arrays of semiconductor devices 110 in lighting subsystem 100 by controller 108. For example, the semiconductor devices of a first array may be controlled to emit light of a first intensity, wavelength, and the like, while those of a second array may be controlled to emit light of a second intensity, wavelength, and the like.

As a further example, under a first set of conditions (e.g. for a specific work piece, photoreaction, and/or set of operating conditions) controller 108 may operate photoreactive system 10 to implement a first control strategy, whereas under a second set of conditions (e.g. for a specific work piece, photoreaction, and/or set of operating conditions) controller 108 may operate photoreactive system 10 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, and the different group of LED devices may include a subset of one or more LED devices from the second group.

The cooling subsystem 18 is implemented to manage the thermal behavior of the lighting subsystem 100. For example, generally, the cooling subsystem 18 provides for cooling of such subsystem 12 and, more specifically, the semiconductor devices 110. The cooling subsystem 18 may also be implemented to cool the work piece 26 and/or the space between the piece 26 and the photoreactive system 10 (e.g., particularly, the lighting subsystem 100). For example, cooling subsystem 18 may be an air or other fluid (e.g., water) cooling system.

The photoreactive system 10 may be used for various applications. Examples include, without limitation, curing applications ranging from ink printing to the fabrication of DVDs and lithography. Generally, the applications in which the photoreactive system 10 is employed have associated parameters. That is, an application may include associated operating parameters as follows: provision of one or more levels of radiant power, at one or more wavelengths, applied over one or more periods of time. In order to properly accomplish the photoreaction associated with the application, optical power may need to be delivered at or near the work piece at or above a one or more predetermined levels of one or a plurality of these parameters (and/or for a certain time, times or range of times).

In order to follow an intended application's parameters, the semiconductor devices 110 providing radiant output 24 may be operated in accordance with various characteristics associated with the application's parameters, e.g., temperature, spectral distribution and radiant power. At the same time, the semiconductor devices 110 may have certain operating specifications, which may be are associated with the semiconductor devices' fabrication and, among other things, may be followed in order to preclude destruction and/or forestall degradation of the devices. Other components of the photoreactive system 10 may also have associated operating specifications. These specifications may include ranges (e.g., maximum and minimum) for operating temperatures and applied, electrical power, among other parameter specifications.

Accordingly, the photoreactive system 10 supports monitoring of the application's parameters. In addition, the photoreactive system 10 may provide for monitoring of semiconductor devices 110, including their respective characteristics and specifications. Moreover, the photoreactive system 10 may also provide for monitoring of selected other components of the photoreactive system 10, including their respective characteristics and specifications.

Providing such monitoring may enable verification of the system's proper operation so that operation of photoreactive system 10 may be reliably evaluated. For example, the system 10 may be operating in an undesirable way with respect to one or more of the application's parameters (e.g., temperature, radiant power, etc.), any components characteristics associated with such parameters and/or any component's respective operating specifications. The provision of monitoring may be responsive and carried out in accordance with the data received by controller 108 by one or more of the system's components.

Monitoring may also support control of the system's operation. For example, a control strategy may be implemented via the controller 108 receiving and being responsive to data from one or more system components. This control, as described above, may be implemented directly (i.e., by controlling a component through control signals directed to the component, based on data respecting that components operation) or indirectly (i.e., by controlling a component's operation through control signals directed to adjust operation of other components). As an example, a semiconductor device's radiant output may be adjusted indirectly through control signals directed to the power source 102 that adjust power applied to the lighting subsystem 100 and/or through control signals directed to the cooling subsystem 18 that adjust cooling applied to the lighting subsystem 100.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 110 or array of semiconductor devices 110 beyond their specifications while also directing radiant energy to the work piece 26 sufficient to properly complete the photoreaction(s) of the application.

In some applications, high radiant power may be delivered to the work piece 26. Accordingly, the subsystem 12 may be implemented using an array of light emitting semiconductor devices 110. For example, the subsystem 12 may be implemented using a high-density, light emitting diode (LED) array. Although LED arrays may be used and are described in detail herein, it is understood that the semiconductor devices 110, and array(s) of same, may be implemented using other light emitting technologies without departing from the principles of the description, examples of other light emitting technologies include, without limitation, organic LEDs, laser diodes, other semiconductor lasers.

The plurality of semiconductor devices 110 may be provided in the form of an array 20, or an array of arrays. The array 20 may be implemented so that one or more, or most of the semiconductor devices 110 are configured to provide radiant output. At the same time, however, one or more of the array's semiconductor devices 110 are implemented so as to provide for monitoring selected of the array's characteristics. The monitoring devices 36 may be selected from among the devices in the array 20 and, for example, may have the same structure as the other, emitting devices. For example, the difference between emitting and monitoring may be determined by the coupling electronics 22 associated with the particular semiconductor device (e.g., in a basic form, an LED array may have monitoring LEDs where the coupling electronics provides a reverse current, and emitting LEDs where the coupling electronics provides a forward current).

Furthermore, based on coupling electronics, selected of the semiconductor devices in the array 20 may be either/both multifunction devices and/or multimode devices, where (a) multifunction devices are capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices are capable of emission, detection and some other mode (e.g., off) and are switched among modes in accordance with the application parameters or other determinative factors.

Referring to FIG. 2, a schematic of a first lighting system circuit that may supply varying amounts of current is shown. Lighting system 100 includes one or more light emitting devices 110. In this example, light emitting devices 110 are light emitting diodes (LEDs). Each LED 110 includes an anode 201 and a cathode 202. Switching power source 102 shown in FIG. 1 supplies 48V DC power to voltage regulator 204 via path or conductor 264. Voltage regulator 204 supplies DC power to the anodes 201 of LEDs 110 via conductor or path 242. Voltage regulator 204 is also electrically coupled to cathodes 202 of LEDs 110 via conductor or path 240. Voltage regulator 204 is shown referenced to ground 260 and may be a buck regulator in one example. Controller 108 is shown in electrical communication with voltage regulator 204. In other examples, discrete input generating devices (e.g., switches) may replace controller 108, if desired. Controller 108 includes central processing unit 290 for executing instructions. Controller 108 also includes inputs and outputs (I/O) 288 for operating voltage regulator 204 and other devices. Non-transitory executable instructions may be stored in read only memory 292 while variables may be stored in random access memory 294. Voltage regulator 204 supplies an adjustable voltage to LEDs 110.

Variable resistor 220 in the form of a field-effect transistor (FET) receives an intensity signal voltage from controller 108 or via another input device. While the present example describes the variable resistor as an FET, one must note that the circuit may employ other forms of variable resistors.

In this example, at least one element of array 20 includes solid-state light-emitting elements such as light-emitting diodes (LEDs) or laser diodes produce light. The elements may be configured as a single array on a substrate, multiple arrays on a substrate, several arrays either single or multiple on several substrates connected together, etc. In one example, the array of light-emitting elements may consist of a Silicon Light Matrix™ (SLM) manufactured by Phoseon Technology, Inc.

The circuit shown in FIG. 2 is a closed loop current control circuit 208. In closed loop circuit 208, the variable resistor 220 receives an intensity voltage control signal via conductor or path 230 through the drive circuit 222. The variable resistor 220 receives its drive signal from the driver 222. Voltage between variable resistor 220 and array 20 is controlled to a desired voltage as determined by voltage regulator 204. The desired voltage value may be supplied by controller 108 or another device, and voltage regulator 204 controls voltage signal 242 to a level that provides the desired voltage in a current path between array 20 and variable resistor 220. Variable resistor 220 controls current flow from array 20 to current sense resistor 255 in the direction of arrow 245. The desired voltage may also be adjusted responsive to the type of lighting device, type of work piece, curing parameters, and various other operating conditions. An electrical current signal may be fed back along conductor or path 236 to controller 108 or another device that adjusts the intensity voltage control signal provided. In particular, if the electrical current signal is different from a desired electrical current, the intensity voltage control signal passed via conductor 230 is increased or decreased to adjust electrical current through array 20. A feedback current signal indicative of electrical current flow through array 20 is directed via conductor 236 as a voltage level that changes as electrical current flowing through current sense resistor 255 changes.

In one example where the voltage between variable resistor 220 and array 20 is adjusted to a constant voltage, current flow through array 20 and variable resistor 220 is adjusted via adjusting the resistance of variable resistor 220. Thus, a voltage signal carried along conductor 240 from the variable resistor 220 does not go to the array 20 in this example. Instead, the voltage feedback between array 20 and variable resistor 220 follows conductor 240 and goes to a voltage regulator 204. The voltage regulator 204 then outputs a voltage signal 242 to the array 20. Consequently, voltage regulator 204 adjusts its output voltage in response to a voltage downstream of array 20, and current flow through array 20 is adjusted via variable resistor 220. Controller 108 may include instructions to adjust a resistance value of variable resistor 220 in response to array current fed back as a voltage via conductor 236. Conductor 240 allows electrical communication between the cathodes 202 of LEDs 110, input 299 (e.g., a drain of an N-channel MOSFET) of variable resistor 220, and voltage feedback input 293 of voltage regulator 204. Thus, the cathodes 202 of LEDs 110 an input side 299 of variable resistor 220 and voltage feedback input 299 are at the same voltage potential.

The variable resistor may take the form of an FET, a bipolar transistor, a digital potentiometer or any electrically controllable, current limiting device. The drive circuit may take different forms depending upon the variable resistor used. The closed loop system operates such that an output voltage regulator 204 remains about 0.5 V above a voltage to operate array 20. The regulator output voltage adjusts voltage applied to array 20 and the variable resistor controls current flow through array 20 to a desired level. The present circuit may increase lighting system efficiency and reduce heat generated by the lighting system as compared to other approaches. In the example of FIG. 2, the variable resistor 220 typically produces a voltage drop in the range of 0.6V. However, the voltage drop at variable resistor 220 may be less or greater than 0.6V depending on the variable resistor's design.

Thus, the circuit shown in FIG. 2 provides voltage feedback to a voltage regulator to control the voltage drop across array 20. For example, since operation of array 20 results in a voltage drop across array 20, voltage output by voltage regulator 204 is the desired voltage between array 20 and variable resistor 220 plus the voltage drop across array 220. If the resistance of variable resistor 220 is increased to decrease current flow through array 20, the voltage regulator output is adjusted (e.g., decreased) to maintain the desired voltage between array 20 and variable resistor 20. On the other hand, if the resistance of variable resistor 220 is decreased to increase current flow through array 20, the voltage regulator output is adjusted (e.g., increased) to maintain the desired voltage between array 20 and variable resistor 20. In this way, the voltage across array 20 and current through array 20 may be simultaneously adjusted to provide a desired light intensity output from array 20. In this example, current flow through array 20 is adjusted via a device (e.g., variable resistor 220) located or positioned downstream of array 20 (e.g., in the direction of current flow) and upstream of a ground reference 260.

Referring now to FIG. 3, a schematic of a second lighting system circuit that may be supplied varying amounts of current is shown. FIG. 3 includes some of the same elements as the first lighting system circuit shown in FIG. 2. Elements in FIG. 3 that are the same as elements in FIG. 2 are labeled with the same numeric identifiers. For the sake of brevity, a description of same elements between FIG. 2 and FIG. 3 is omitted; however, the description of elements in FIG. 2 applies to the elements in FIG. 3 that have the same numerical identifiers.

The lighting system shown in FIG. 3 includes a SLM section 301 that includes array 20 which includes LEDs 110. The SLM also includes switch 308 and current sense resistor 255. However, switch 308 and current sense resistor may be included with voltage regulator 304 or as part of controller 108 if desired. Voltage regulator 304 includes voltage divider 310 which is comprised of resistor 313 and resistor 315. Conductor 340 puts voltage divider 310 into electrical communication with cathodes 202 of LEDs 110 and switch 308. Thus, the cathodes 202 of LEDs 110, an input side 305 (e.g., a drain of a N channel MOSFET) of switch 308, and node 321 between resistors 313 and 315 are at a same voltage potential. Switch 308 is operated in only open or closed states, and it does not operate as a variable resistor having a resistance that can be linearly or proportionately adjusted. Further, in one example, switch 308 has a Vds of 0 V as compared to 0.6V Vds for variable resistor 220 shown in FIG. 2.

The lighting system circuit of FIG. 3 also includes an error amplifier 326 receiving a voltage that is indicative of current passing through array 20 via conductor 340 as measured by current sense resistor 255. Error amplifier 326 also receives a reference voltage from controller 108 or another device via conductor 319. Output from error amplifier 326 is supplied to the input of pulse width modulator (PWM) 328. Output from PWM is supplied to buck stage regulator 330, and buck stage regulator 330 adjusts current supplied between a regulated DC power supply (e.g., 102 of FIG. 1) and array 20 from a position upstream of array 20.

In some examples, it may be desirable to adjust current to array via a device located or upstream (e.g., in the direction of current flow) of array 20 instead of a position that is downstream of array 20 as is shown in FIG. 2. In the example lighting system of FIG. 3, a voltage the feedback signal supplied via conductor 340 goes directly to voltage regulator 304. An intensity voltage control signal supplied via conductor 319 from controller 108 becomes a reference signal Vref, and it is applied to error amplifier 326 rather than to the drive circuit for a variable resistor.

The voltage regulator 304 directly controls the SLM current from a position upstream of array 20. In particular, resistor divider network 310 causes the buck regulator stage 330 to operate as a traditional buck regulator that monitors the output voltage of buck regulator stage 330 when the SLM is disabled by opening switch 308. The SLM may selectively receive an enable signal from conductor 302 which closes switch 308 and activates the SLM to provide light. Buck regulator stage 330 operates differently when a SLM enable signal is applied to conductor 302. Specifically, unlike more typical buck regulators, the buck regulator controls the load current, the current to the SLM and how much current is pushed through the SLM. In particular, when switch 308 is closed, current through array 20 is determined based on voltage that develops at node 321.

The voltage at node 321 is based on the current flowing through current sense resistor 255 and current flow in voltage divider 310. Thus, the voltage at node 321 is representative of current flowing through array 20. A voltage representing SLM current is compared to a reference voltage that represents a desired current flow through the SLM. If the SLM current is different from the desired SLM current, an error voltage develops at the output of error amplifier 326. The error voltage adjusts a duty cycle of PWM generator 328 and a pulse train from PWM generator 328 controls a charging time and a discharging time of a coil within buck stage 330. The coil charging and discharging timing adjusts an output voltage of voltage regulator 304. Since the resistance of array 20 is constant, current flow through array 20 may be adjusted via adjusting the voltage output from voltage regulator 304 and supplied to array 20. If additional array current is desired, voltage output from voltage regulator 304 is increased. If reduced array current is desired, voltage output from voltage regulator 304 is decreased. FIG. 4 provides a more detailed description of the lighting system shown in FIG. 3. Those skilled in the art appreciate that the implementation of FIG. 3 presents merely one possible circuit in accordance with the examples discussed here.

Referring now to FIG. 4, a detailed view of the lighting system described in FIG. 3 is shown. The SLM portion 301 is at the left side of the diagram. The error amplifier 326 is at the bottom middle of the diagram, with the PWM generator 328 at the top of FIG. 4. The buck regulator stage 330 lies at the right side of FIG. 4. An enable signal GENABLE may be provided to the SLM at switch 308 via conductor 302. In one example where switch 308 is a FET, the source of switch 308 is in electrical communication with current sense resistor 255. A drain of switch 308 is in electrical communication with cathodes of array 20 shown in FIG. 3.

Amplifier 473 applies a gain to the voltage at node 321 and outputs a voltage to amplifier 475 which represent current flow through array 20. Amplifier 475 compares current flow through array 20 and a desired intensity SLM DRIVE which is indicative of a desired current flow through array 20. Amplifier 475 outputs a voltage at output 451 that is representative of a difference between an intensity setting from SLM DRIVE (may be provided by controller 108 of FIG. 1) and the array current as is determined from voltage at node 321. Thus, the output of error amplifier 326 is a voltage that represents a desired change in current, and where the desired change in current is based on a difference in current flowing through array 20 and a desired array current represented as an intensity level SLM DRIVE. The voltage output from amplifier 326 is directed to PWM generator 328.

It should be noted that controlling current through array 20 to control light intensity may provide more repeatable light intensity and improved lighting device control as compared to controlling voltage across array. By controlling current through array 20 rather than voltage across array 20, light intensity control may be improved because light intensity output from array 20 may change even though a constant voltage is applied across array 20 because resistance or impedance of lighting system components may change with age, temperature, and other operating conditions to affect current flow through array 20. Since light intensity may be directly correlated to current flow through array 20, controlling current flow through array 20 may be a more effective way to control light intensity of array 20 than controlling voltage across array 20.

PWM generator section 328 includes a PNP transistor 404 that supplies a constant current amount to capacitor 405. Timing circuit 401 operates to pull capacitor 405 toward ground (GND) via an open collector transistor (not shown). Timing circuit 401 along with PNP transistor 404 and capacitor 405 generate a ramping signal at a frequency that is related to the value of capacitor 403. In one example, timer circuit 401 is a 555 timer. In one example, the timing circuit 401, capacitor 405, and PNP transistor 404 provide a 350 KHz ramping signal output to the inverting input of comparator 406. Comparator 406 receives its inverting input (e.g., − input) from timing circuit 401 including transistor 404 and capacitor 405. Comparator 406 receives its non-inverting input from the output of error amplifier 326. The output 453 of comparator 406 goes high when a voltage at the inverting input is greater than the voltage at the non-inverting input. Comparator 406 outputs a pulse train with a varying duty cycle to buck stage 330. The pulse train duty cycle is related to an error between an actual current flow through array 20 and a desired current flow through array 20. The PWM generator section 328 provides an output signal having a duty cycle corresponding to the level of the error voltage that corresponds to a current flow error based on current flow through array 20. If the DC level of the error voltage is midlevel, the duty cycle is 50%. If the DC level goes up the duty cycle will approach 100%.

Buck stage 330 includes a current driver 407 that supplies an increased amount of current to switching devices 408 and 409 than may be sourced by comparator 406. In one example, current driver 407 includes a boost converter to increase the voltage supplied to the gate of switching device 408 to a level 12 VDC above the voltage at the source of switching device 408 so that switching device 408 may be activated. Current driver 407 alternatively operates switching device 408 and 409 to selectively charge and discharge inductor 426 via voltage supplied by DC voltage source 102. The output of inductor 426 is filtered via capacitors 428, 430, and 432. The regulated voltage output from inductor 426 is bucked down to lower than voltage output from DC voltage source 102. Finally, the voltage output 455 from buck stage 330 is applied to the anodes of LEDs in array 20 and to voltage divider 310.

In this way, current flow through array 20 is monitored and compared to a desired current flow through array 20. If the actual current flow through array 20 deviates from the desired current flow, output of the PWM generator is adjusted, thereby altering the charging and discharging of inductor or coil 426. The voltage output from inductor or coil 426 is varied in response to the difference in actual current flowing through array 20 and desired current flow through array 20 to adjust voltage applied to array 20 and current flow through array 20. Consequently, the voltage output from buck stage 330 is adjusted responsive to a current flow through array 20. It should be noted that array 20 represents a load applied to voltage regulator 304; however, the load may be any type of electrical load.

Thus, the systems of FIGS. 1-4 provide for operating one or more light emitting devices, comprising: a voltage regulator including a feedback input, the voltage regulator in electrical communication with the one or more light emitting devices; and a current sensing device positioned in a current path through which a current passes through the one or more light emitting devices. The system further comprises a current controlling device positioned in the current path upstream of the current sensing device and downstream of the one or more light emitting devices. The system includes where the current controlling device is a variable resistor.

In some examples, the system includes where the variable resistor is a FET. The system also includes where the voltage regulator is a buck regulator. The system includes where the current sensing device in direct electrical communication with the feedback input. The system also includes where the feedback input is in direct electrical communication with an electrical node positioned between the one or more light emitting devices and a variable resistor, and where the variable resistor is positioned upstream of the current sensing device in the current path. The system also includes where the feedback input is a voltage input receiving a voltage at a cathode of the one or more light emitting devices.

In another example, the systems of FIGS. 1-4 provide for operating one or more light emitting devices, comprising: a current controlled voltage regulator including a current feedback input, the current controlled voltage regulator in electrical communication with the one or more light emitting devices; and a current sensing device positioned in a current path through which a current passes through the one or more light emitting devices, the current sensing device in direct electrical communication with the current feedback input. The system includes where the current controlled voltage regulator includes a lighting device array current error amplifier.

In some examples, the system includes where the current controlled voltage regulator includes a pulse width modulated generator. The system includes where the current controlled voltage regulator includes a buck stage that receives a supply voltage from a DC voltage source. The system includes where the lighting device array current error amplifier is electrically coupled to the pulse width modulation generator, and where an output of the pulse width modulation generator is input to the buck stage. The system further comprises a controller, the controller including instructions for adjusting a light intensity of the one or more light emitting devices.

Figure 5:
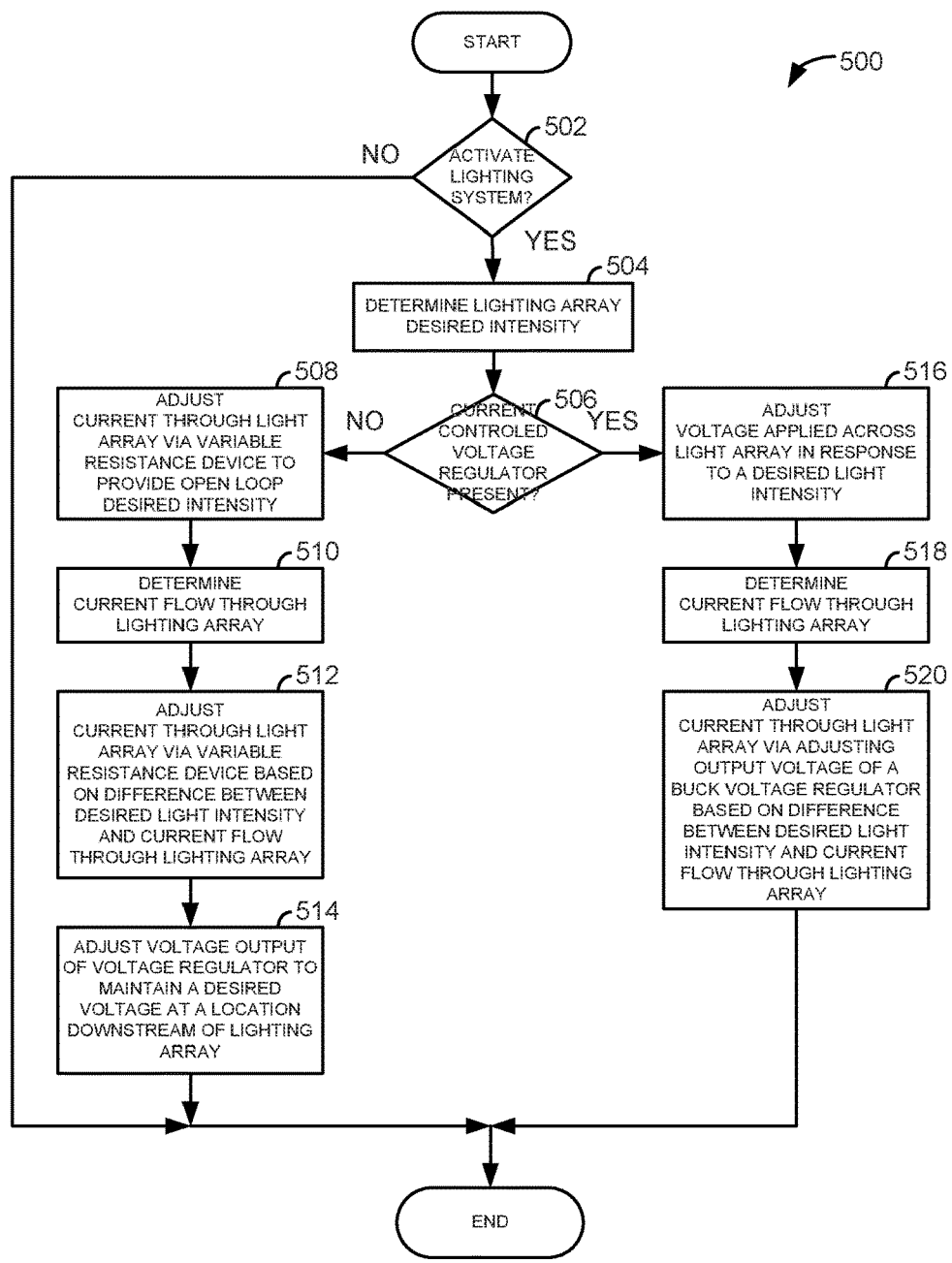
FIG. 5 shows an example method for controlling current in a photoreactive system.

Referring now to FIG. 5, a method for operating the lighting systems as described in FIGS. 1-4 is shown. The method of FIG. 5 may be stored in non-transitory memory of controller 108 shown in FIG. 1 as executable instructions.

At 502, method 500 judges whether or not there has been a request to activate a lighting system. In one example, the lighting system is as shown in FIGS. 1-4. A request to activate the lighting system may be initiated via an operator command (e.g., activation of a switch) or via a controller command. The request to activate the lighting system may be input to a controller 108 shown in FIG. 1. If method 500 determines a request to activate the lighting system is present, the answer is yes and method 500 proceeds to 504. Otherwise, the answer is no and method 500 proceeds to exit.

At 504, method 500 determines a desired intensity (e.g., lumen output) for the lighting array. The desired intensity may be based on the type of lighting device, curing parameters, work piece conditions, or other operating conditions. The desired intensity may correspond to a specific current flow rate through the lighting array. For example, a lighting intensity of X lumens may be provided when Y amps flow through the array of lighting devices. In one example, the lighting intensity is used to index a table or function of empirically determined values of electrical current that provide the desired lighting intensity. Method 500 proceeds to 506 after the desired lighting intensity is determined.

At 506, method 500 judges whether or not a current controlled voltage regulator is present in the lighting system. In one example, method 500 judges that a current controlled voltage regulator is in the lighting system when a particular bit is set in memory. If method 500 judges that a current controlled voltage regulator is in the present lighting system, the answer is yes and method 500 proceeds to 516. Otherwise, the answer is no and method 500 proceeds to 508.

At 508, method 500 adjusts current flowing through an array of lighting devices (e.g., array 20 of FIG. 1) to provide a desired lighting intensity. In one example, the desired lighting intensity is increased via increasing a voltage that represents a desired lighting intensity and current flow through the light array. Similarly, a desired lighting intensity may be reduced via decreasing the voltage that represents the desired lighting intensity and current flow through the light array. The voltage is adjusted to a value that represents the desired lighting intensity as determined at 504. In one example, a controller outputs an analog voltage that corresponds to the desired lighting intensity and current flow through the lighting array.

The desired light intensity voltage is applied to a variable resistor to adjust current flow through the light array. Current flow through the light array may be adjusted linearly or proportionately with the desired light intensity voltage. In one example, the desired light intensity voltage is applied according to FIG. 2 via conductor 230 to a drive circuit 222 and output from the drive circuit is applied to control variable resistor 220. Method 500 proceeds to 510 after the current flow through the lighting array is adjusted.

At 510, method 500 determines an amount of current flowing through the lighting array. In one example, a current sensing resistor (e.g., resistor 255 shown in FIG. 2) is placed in a current path in which current from a lighting array flows. If current flows through the lighting array, a voltage develops across the sense resistor. The voltage may be directed to a controller (e.g., controller 108 of FIG. 1) that converts the voltage to a current based on ohm's law. Method 500 proceeds to 512 after current flowing through the lighting array is determined.

At 512, method 500 adjusts electrical current flowing through the lighting array. In one example, the electrical current flowing through the lighting array is adjusted via changing a resistance value of a variable resistor placed in series with a lighting array and different levels of electrical potential (e.g., ground and V+). The resistance of the variable resistor may be adjusted by a controller or an amplifier. In one example, a controller converts current flow through the light array as determined at 510 to a light intensity via a transfer function or empirically determined table of values.

The controller also compares the light intensity to a desired light intensity. Alternatively, electrical current flow through the lighting array and desired current flow through the lighting array may be used in place of light intensity. If the light intensity is different from the desired light intensity, a control signal applied to a driver is adjusted so that the resistance value of the variable resistor 220 is adjusted such that current flow through the lighting array converges to the desired current flow through the lighting array. For example, if desired lighting array current is greater than actual lighting array current, the resistance value of the variable resistor is decreased. Alternatively, if the desired lighting array current is less than actual lighting array current, the resistance value of the variable resistor is increased. In this way, current flow through the lighting array is adjusted in a closed loop manner. Method 500 proceeds to 514 after current flow through the lighting array is adjusted.

At 514, method 500 adjusts voltage output from a voltage regulator to maintain a desired voltage at a location in a circuit that is downstream of a lighting array according to a direction of current flow through the lighting array. In one example, a voltage at a location downstream of a lighting array is input to a voltage feedback input of a voltage regulator. The voltage regulator adjusts output of the voltage regulator to provide a desired voltage at the location downstream of the lighting array. In particular, the voltage at the location downstream of the lighting array is compared to a desired voltage. If there is a difference between the two voltages, the output of the voltage regulator is adjusted to provide the desired voltage. For example, if the voltage downstream of the lighting array is less than desired, output voltage of the voltage regulator is increased until the voltage downstream of the lighting array matches the desired voltage. In this way, output of the voltage regulator is adjusted so that a desired current flow through the lighting array may be provided by changing a value of the variable resistor. Method 500 proceeds to exit after the output voltage of the voltage regulator is adjusted.

At 516, method 500 adjusts a voltage applied across a lighting array in response to a desired lighting intensity as determined at 504. In one example, the voltage output of a buck regulator (e.g., see FIG. 4) is adjusted in response to a voltage that represents a desired light intensity. The voltage representing the desired light intensity or current flow through the lighting array is input to a lighting array current error stage. Note that current flow through the lighting array may be correlated to a lighting intensity. The lighting array current error stage compares lighting array current to desired lighting array current or lighting intensity and a signal for adjusting buck voltage regulator output is provided to adjust buck regulator output. Method 500 proceeds from 516 to 518 after voltage applied across the lighting array is adjusted.

At 518, method 500 determines an amount of current flowing through a lighting array as described at 510. Specifically, current flow through a lighting array is determined based on a voltage that develops across a current sense resistor (e.g., 255 of FIG. 3). Method 500 proceeds to 520 after current flow through the lighting array is determined.

At 520, method 500 adjusts electrical current flow through the lighting array via adjusting voltage applied across the lighting array. In this example, a voltage representing electrical current flowing through array 20 is input to a lighting array current error stage (e.g., 326 of FIG. 3) of a voltage regulator supplying power to a lighting array. The voltage representing current flow through the lighting array is subtracted from a desired current flowing through the lighting array or a lighting intensity to produce an error signal. The error signal is input to a pulse width modulation generator to produce a pulse width modulated voltage output that is proportional to the lighting array current error. The pulse width modulated voltage output is input to a buck regulator and voltage output of the buck regulator is adjusted in response to the pulse width modulated voltage. Such operation is described in FIGS. 3 and 4. In this way, the buck voltage regulator is current controlled so as to cause current flow through the lighting array to converge to the desired current and lighting intensity. Method 500 proceeds to exit after current flowing through the lighting array is adjusted via increasing or decreasing voltage output from the buck voltage regulator.

Thus, the method of FIG. 5 provides for a method for operating one or more light emitting devices, comprising: supplying electrical power to one or more light emitting devices via a voltage regulator; and adjusting current flow through the one or more light emitting devices in response to a current flowing through the one or more light emitting devices. The method includes where the current flowing through the one or more light emitting devices is controlled via a variable resistance device. The method also includes where adjusting current flow through the one or more light emitting devices includes adjusting a voltage output from the voltage regulator in response to the current flowing through the one or more light emitting devices.

In another example, the method also includes where the current flowing through the one or more light emitting devices is controlled via adjusting a voltage output from the voltage regulator. The method further comprises adjusting the voltage output from the voltage regulator in response to a light array current error. The method further comprises adjusting the voltage output from the voltage regulator in response to output of a pulse width modulation generator.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, lighting sources producing different wavelengths of light may take advantage of the present description.

The invention claimed is:
1. A system for operating one or more light emitting devices, comprising:
 a voltage regulator including a voltage feedback input receiving input from a voltage divider network electrically coupled to cathodes of the one or more light emitting devices, the voltage regulator in electrical communication with an input of a current controlling device and the cathodes of the one or more light emitting devices, the voltage regulator including an error amplifier; and a current sensing device positioned in a current path through which a current passes through the one or more light emitting devices, the current sensing device in electrical communication with a controller different than the voltage regulator, the controller including instructions to adjust light intensity of the one or more light emitting devices, where the voltage feedback input is in direct electrical communication with an electrical node positioned between the one or more light emitting devices and a variable resistor, and where the variable resistor is positioned upstream of the current sensing device in the current path.

2. The system of claim 1, where the controller instructions adjust the lighting intensity via a current controlling device and where the voltage regulator comprises the error amplifier, a pulse width generator, and a buck stage amplifier.

3. The system of claim 2, where the current controlling device is a variable resistor.

4. The system of claim 3, where the variable resistor is a FET.

5. The system of claim 1, where the voltage regulator is a buck regulator.

6. The system of claim 1, where the current sensing device is in electrical communication with the voltage feedback input.

7. The system of claim 1, where the voltage feedback input is a voltage input receiving a voltage at a cathode of the one or more light emitting devices.

8. A system for operating one or more light emitting devices, comprising:
a current controlled voltage regulator including a current feedback input, the current controlled voltage regulator in electrical communication with the one or more light emitting devices, the current controlled voltage regulator including an error amplifier that is electrically coupled to a pulse width modulation generator, and where an output of the pulse width modulation generator is input to a buck stage amplifier; and
a current sensing device positioned in a current path through which a current passes through the one or more light emitting devices, the current sensing device in direct electrical communication with the current feedback input.

9. The system of claim 8, further comprising a controller including controller instructions to supply a reference signal to the error amplifier.

10. The system of claim 8, where the error amplifier includes two amplifiers.

11. The system of claim 10, where a first of the two amplifiers applies a gain to a voltage at cathodes of the one or more light emitting devices.

12. The system of claim 10, where a second of the two amplifiers is in electrical communication with a comparator of the pulse width modulation generator.

13. The system of claim 8, where the buck stage amplifier includes two switches.

14. A method for operating one or more light emitting devices, comprising:
supplying a voltage to the one or more light emitting devices via a voltage regulator in response to current flow through the one or more light emitting devices;
providing current feedback to the voltage regulator via a voltage divider resistor network; and
adjusting the voltage output from the voltage regulator in response to output of a pulse width modulation generator.

15. The method of claim 14, where the voltage divider resistor network is in electrical communication with cathodes of the one or more light emitting diodes.

16. The method of claim 14, where the voltage divider resistor network is in electrical communication with anodes of the one or more light emitting diodes.

17. The method of claim 14, where a current flowing through the one or more light emitting devices is controlled via adjusting a voltage output from the voltage regulator.

18. The method of claim 17, further comprising adjusting the voltage output from the voltage regulator in response to a light array current error.

* * * * *